United States Patent [19]

Magara et al.

[11] Patent Number: 5,416,290

[45] Date of Patent: May 16, 1995

[54] ELECTRIC DISCHARGE MACHINE POWER SUPPLY CIRCUIT

[75] Inventors: Takuji Magara; Hisashi Yamada, both of Aichi, Japan

[73] Assignee: Mitsubishi Denki Kabushiki Kaisha, Tokyo, Japan

[21] Appl. No.: 985,953

[22] Filed: Dec. 4, 1992

[30] Foreign Application Priority Data

Oct. 8, 1992 [JP] Japan .................................. 4-270297

[51] Int. Cl.⁶ .............................................. B23H 1/02
[52] U.S. Cl. ............................................... 219/69.18
[58] Field of Search ......................... 219/69.13, 69.18

[56] References Cited

U.S. PATENT DOCUMENTS

| 4,678,884 | 7/1987 | Obara et al. | 219/69.18 |
| 5,064,984 | 11/1991 | Yamamoto et al. | 219/69.18 |

FOREIGN PATENT DOCUMENTS

| 0134679 | 3/1985 | European Pat. Off. | |
| 495985 | 7/1992 | European Pat. Off. | 219/69.18 |
| 55-101336 | 8/1980 | Japan | 219/69.13 |
| 61-4620 | 1/1986 | Japan . | |
| 61-192415 | 8/1986 | Japan . | |
| 63-68317 | 3/1988 | Japan . | |
| 64-34612 | 2/1989 | Japan | 219/69.13 |
| 6445522 | 5/1989 | Japan . | |
| 3-208520 | 9/1991 | Japan | 219/69.13 |
| 9203246 | 3/1992 | WIPO | 219/69.18 |

*Primary Examiner*—Geoffrey S. Evans
*Attorney, Agent, or Firm*—Sughrue, Mion, Zinn, Macpeak & Seas

[57] ABSTRACT

An electrical discharge machine equipped with a machining gap voltage application circuit having switching circuits capable of switching between a first voltage application state wherein one terminal of a first direct-current power supply is connected to an electrode and the other terminal thereof is connected to a workpiece and a first voltage is applied to the gap, a second voltage application state wherein the one terminal is connected to the workpiece and the other terminal is connected to the electrode and a second voltage is applied to the gap, and a second voltage application reset state where the second voltage is not applied to the gap. The switching circuits are operative during a first period of time when the second voltage application state and a second voltage application reset state alternate with each other, and a second period of time when the first voltage application state exists, the first and second periods are repeated in a predetermined sequence.

32 Claims, 13 Drawing Sheets

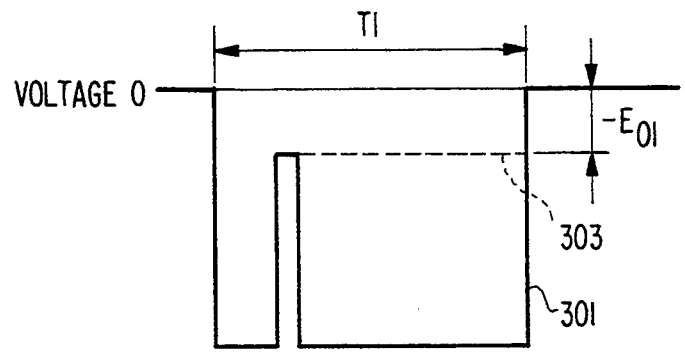
FIG. 3(a)
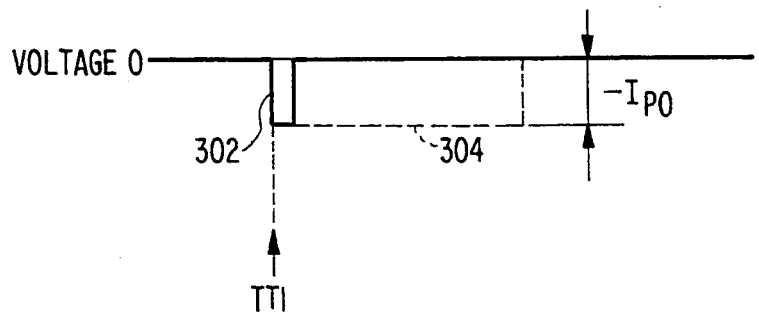
FIG. 3(b)
FIG. 7
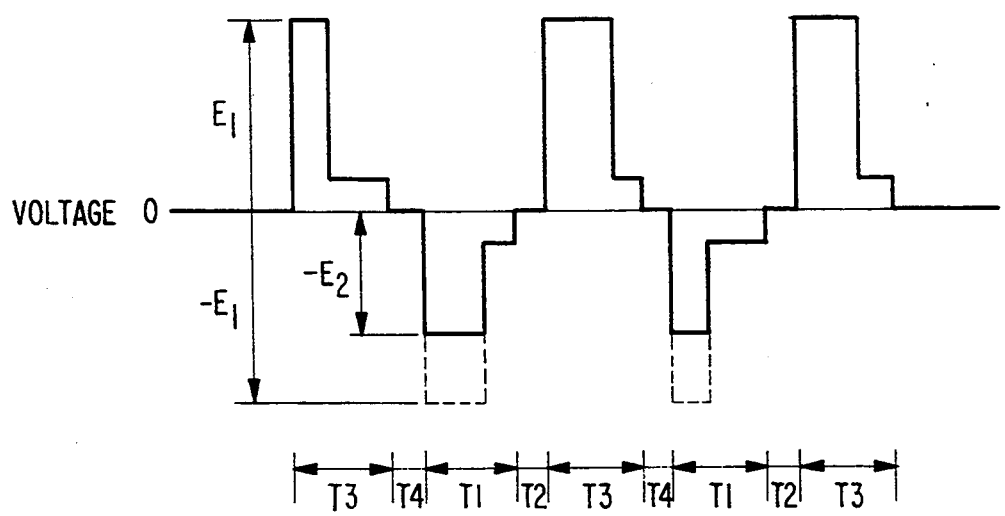

WHEN DUTY FACTOR IS LARGE

WHEN DUTY FACTOR IS SMALL

ELECTRIC DISCHARGE MACHINE POWER SUPPLY CIRCUIT

BACKGROUND OR THE INVENTION

1. Field of the Invention

The present invention relates to an electrical discharge machine (EDM) which variably controls the machining quality of the machined surface of a workpiece.

2. Description of the Background Art

FIG. 14 is a block diagram of a machining gap voltage application circuit in a known electrical discharge machine disclosed in Japanese Patent Disclosure Publication No. 4620 of 1986. This machining gap voltage application circuit generates a voltage applied to a machining gap between a workpiece and an electrode in an electrical discharge machine.

Referring to FIG. 14, the numeral 1 indicates an electrode, 2 a workpiece, 3 a first direct-current power supply having an output voltage E1, and 12 to 15 switching circuits, e.g., semiconductor switching devices.

A series connection of the semiconductor switching device 12 and a resistor 16 is connected between the anode of the first direct-current power supply 3 and the electrode 1, and a series connection of the semiconductor switching device 14 and a resistor 17 is connected between the anode of the first direct-current power supply 3 and the workpiece 2. The resistors 16 and 17 constitute a resistor circuit.

The semiconductor switching device 13 is connected between the cathode of the first direct-current power supply 3 and the electrode 1, and the semiconductor switching device 15 is connected between the cathode of the first direct-current power supply 3 and the workpiece 2.

A third direct-current power supply 7, whose output voltage is E3, forms a series connection with a semiconductor switching device 18, a resistor 19 and a diode 20, between the electrode 1 and the workpiece 2.

In this series connection, the diode 20 is installed in a direction in which a current flows from the electrode 1 to the workpiece 2.

Driving circuits 21–25 are operative to drive the semiconductor switching devices 12 to 15 and 18. A control circuit 26 provides a control signal to the driving circuits 21 to 25 for exercising the ON/OFF control of the semiconductor switching devices 12 to 15 and 18.

The output voltage E3 of the third direct-current power supply 7 is higher than the voltage E1 of the first direct-current power supply 3, and the resistance value of the resistor 19 is set to be sufficiently smaller than those of the resistors 16 and 17.

The voltage of the electrode 1 is transmitted to the control circuit 26 by a signal line 927, and the voltage between the workpiece 2 and the control circuit 26 is established by a signal line 928.

The control signal output by the control circuit 26 is transmitted to the driving circuits 21 and 24 via signal line 929 and the control signal output from the control circuit 26 to the driving circuits 22 and 23 is transmitted by line 930.

Finally, the control signal output by the control circuit 26 is transmitted to the driving circuit 25 via line 931.

The operation of the machining gap voltage application circuit shown in FIG. 14 will now be described. In FIG. 14, the control circuit 26 exercises control to operate the semiconductor switching devices 12 and 15 ON/OFF simultaneously and turn the semiconductor switching devices 13 and 14 ON/OFF simultaneously. Control circuit 26 also carries out control to operate the semiconductor switching devices 12 and 13 ON/OFF on a complementary basis and operate the semiconductor switching devices 14 and 15 ON/OFF on a complementary basis.

When the semiconductor switching devices 13 and 14 are turned ON and an electrical discharge is started with a higher voltage imposed on the workpiece 2 than on the electrode 1, i.e., a positive voltage is applied to the machining gap, the semiconductor switching device 18 is turned ON to impose the voltage E3 of the third direct-current power supply 7 between the workpiece 2 and the electrode 1, whereby a large discharge current flows between the workpiece 2 and the electrode 1.

After a predetermined time has elapsed, the control circuit 26 exercises control to turn the semiconductor switching devices 13 and 14 OFF and also turn the semiconductor switching device 18 OFF.

The workpiece 2 is machined by the discharge in a state wherein the positive voltage is applied to the machining gap when the semiconductor switching devices 13 and 14 are ON. In a state wherein a higher voltage is imposed onto the electrode 1 than onto the workpiece 2, i.e., a negative voltage is applied to the machining gap, when the semiconductor switching devices 12 and 15 are ON, the offset of an average voltage applied between the workpiece 2 and the electrode 1 is corrected in a decreasing direction, thereby reducing electrolysis and electrolytic corrosion.

The operation of the conventional machining gap voltage application circuit in a machine shown in FIG. 14 will now be described with reference to an operation flowchart given in FIG. 15 and the machining gap voltage and current waveforms shown in FIGS. 16($a$) and 16($b$).

When an operation START command is given to the machining gap voltage application circuit, the processing shifts from step S200 to step S201 in FIG. 15.

In the step S201, the semiconductor switching devices 12 and 15 are turned ON and the semiconductor switching devices 13, 14 and 18 are turned OFF.

In this state, the anode voltage of the first direct-current power supply 3 is imposed onto the electrode 1 via the semiconductor switching device 12 and the resistor 16, and the cathode voltage of the first direct-current power supply 3 is applied to the workpiece 2 via the semiconductor switching device 15.

The processing immediately shifts from the step S201 to step S202, where the state set in the step S201 is held for a period of time T1. The processing then progresses to step S203.

In the period of time T1 in the step S202, a voltage of $-E1$ is generated in the machining gap until an electrical discharge takes place, and when the discharge is initiated, a voltage of $-E01$ is developed, as shown in FIGS. 16($a$) and 16($b$).

From a time when the discharge is initiated until period T1 ends, a negative current of $-$Iop flows in the machining gap as shown in FIG. 16($b$). The absolute value of the voltage $-E01$ is smaller than that of $-E1$.

In the step S203, the semiconductor switching devices 12, 15 and 18 are turned OFF, whereby the voltage is not applied to the machining gap. The processing then advances to step S204 immediately.

In the step S204, the state set in the step S203 is held for a period of time T2 shown in FIG. 16(a), and the processing moves on to a next step S205.

In the step S205, the semiconductor switching devices 12, 15 and 18 remain OFF and the semiconductor switching devices 13 and 14 are turned ON.

In this state, the anode voltage of the first direct-current power supply 3 is imposed onto the workpiece 2 via the semiconductor switching device 14 and the resistor 17, and the cathode voltage of the first direct-current power supply 3 is applied to the electrode 1 via the semiconductor switching device 13.

The processing then shifts from the step S205 to step S206 immediately.

In the step S206, it is determined whether or not an electrical discharge has taken place. If the discharge has not yet occurred, the processing proceeds to step S208.

In the step S208, it is judged whether or not a period of time T3 has ended after the shift from the step S204 to the step S205 has been performed. If it has not yet ended, the processing returns to the step S206. If the discharge has already taken place in the step S206, the processing progresses to a next step S207.

In the step S207, the semiconductor switching device 18 is turned ON. When this switching device 18 is turned ON, the anode voltage of the third direct-current power supply 7 is imposed onto the workpiece 2 and the cathode voltage thereof onto the electrode 1 via the semiconductor switching device 18, the resistor 19 and the diode 20. Then, the processing immediately advances from the step S207 to the step S208.

If, in the step S208, it has been determined that the time T3 has not ended after the shift from the step S204 to the step S205, the processing returns to the step S206 as described above. If it has ended, the processing moves on to step S209.

In FIGS. 16(a) and 16(b), the state in the steps S205 to S208 is indicated by the time T3, wherein the voltage of E1 is developed in the machining gap until the discharge is initiated, and a voltage of E11 is generated when the discharge is started.

From when the discharge is started until the time T3 ends, a positive current Ip flows in the machining gap as shown in FIG. 16(b).

The voltage of E11 is smaller than that of E1, and the absolute value of −Iop is smaller than that of Ip.

The absolute value of −Iop is smaller than that of Ip because the resistance values of the resistors 19 and 17 are smaller than that of the resistor 16 as described above.

In the step S209, the semiconductor switching devices 13, 14 and 18 are turned OFF, whereby the voltage is not imposed to the machining gap. The processing then goes to step S210.

In the step S210, the state set in the step S209 is held for a period of time T4 shown in FIGS. 16(a) and 16(b). When this time has elapsed, the processing returns to the first step S201.

In the known machine shown in FIG. 14, the negative voltage, i.e., the voltage applied to render the voltage of the electrode 1 higher than that of the workpiece 2 is supplied by the direct-current power supply 3 which supplies the high positive voltage for starting the electrical discharge. Therefore, the negative voltage also becomes high and the discharge is also developed by the negative voltage.

The discharge due to this negative voltage is a small-energy discharge which is limited in current by the resistor 16 and continues for about several ten microseconds, posing almost no problem when the workpiece 2 is a ferrous material. In sintered materials such as carbide alloys, conductive ceramics and diamond-sintered materials, however, microcracks of approximately 10 microns in depth or width will occur, significantly degrading the machining quality of the machined surface.

The discharge resulting from the negative voltage continuing for about several ten microseconds will accelerate the consumption of the electrode 1 and cause the electrode material having melted from the electrode 1 to attach to the workpiece 2, reducing the machining quality of the machined surface.

Since the machining gap voltage application circuit of the known electrical discharge machine is arranged as described above, the voltage of the power supply which imposes the negative voltage is high and the discharge current due to the negative voltage considerably degrades the machining quality of the machined surface of the workpiece 2.

Another conventional approach is disclosed in U.S. Pat. No. 4,678,884. This patent teaches the use of an inverse voltage time adjustment circuit, which detects an average voltage applied between a wire electrode and a workpiece and outputs a pulse having a width corresponding to such average voltage, and an inverse voltage adjustment circuit which provides an output corresponding to the holding voltage of a sample hold circuit for detecting and holding a difference between a transistor-to-resistor voltage and a reference voltage at the application of an inverse voltage for a period of the output pulse time of the inverse voltage time adjustment circuit. In this conventional design, the output of the inverse voltage adjustment circuit causes the transistor to conduct and perform class A amplification operation, whereby the peak voltage of the inverse voltage is rendered constant and an average machining voltage is zeroed.

In the above referenced patent, the peak voltage of the inverse voltage is cut because great damage to the electrode must be avoided. However, since the design in the patent was not intended to prevent the discharge from occurring at the application of a negative voltage where possible, a discharge is generated at the application of a negative voltage as in the conventional design shown in FIG. 14. When the discharge takes place, the machining gap voltage is reduced, and a large current starts to flow in the machining gap. As a result, a detrimental arc is liable to persist, and this design is found to have the same disadvantages as those of the conventional design shown in FIG. 14.

In addition, since this conventional design causes the transistor to perform class A amplification operation, the transistor may generate heat if it attempts to exercise the output control of a high-power EDM power supply.

SUMMARY OF THE INVENTION

It is accordingly an object of the present invention to overcome the disadvantages in the background art by providing an electrical discharge machine which not only prevents the quality of the machined surface of a workpiece from being degraded by a negative-voltage electrical discharge but also ensures high machining quality for the machined surface if the voltage of a power supply for applying a negative voltage to a machining gap is so high that a discharge may be generated.

It will be apparent that the invention achieves an electrical discharge machine equipped with a machining gap voltage application circuit having switching circuits capable of switching between a first voltage application state wherein one terminal of a first direct-current power supply is connected to an electrode and the other terminal thereof connected to a workpiece and a second voltage application state wherein said one terminal is connected to the workpiece and said other terminal is connected to the electrode. Since such switching circuits cause a period of time when the second voltage application state and a second voltage application reset state alternate with each other, and a period of time when the first voltage application state lasts to be repeated in a predetermined sequence, the offset of an average voltage between the electrode and the workpiece occurring in the first voltage application state is reduced by the second voltage application state, thereby preventing the workpiece from being deformed by electrolysis or electrolytic corrosion and also keeping the machined surface quality of the workpiece from being worsened by an electrical discharge in the second voltage application state.

Also, the voltage applied between the electrode and the workpiece in the second voltage application state is clamped to a predetermined value by a series connection of a second direct-current power supply and a rectifier circuit or a series connection of a constant-voltage circuit and the rectifier circuit. Therefore, the discharge occurring in the second voltage application state can be prevented or weakened, ensuring the improvement in machined surface quality of the workpiece.

Further, the voltage applied between the electrode and the workpiece in the second voltage application state is changed to a predetermined smaller value by a series connection of a resistor and a switching element which is turned ON/OFF at a predetermined duty factor, such series connection being made between the electrode and the workpiece. Therefore, the discharge taking place in the second voltage application state can be prevented or weakened, ensuring the improvement in machined surface quality of the workpiece.

The invention achieves an electrical discharge machine which, in addition allows the average voltage between the electrode and workpiece to be zeroed easily and improves machining speed.

The invention also achieves an electrical discharge machine which prevents the generation of arc which affects machined surfaces at the time of positive-polarity or negative-polarity voltage application by applying an offset current to one generated from the capacitance at the gap.

The invention also allows optimum machining conditions to be selected according to a material to be machined, prevents the generation of microcracks if a material machined is different, and ensures stable, high-level machining with a workpiece protected from electrolytic corrosion.

BRIEF DESCRIPTION OF THE DRAWINGS

FIGS. 3(a) and 3(b) illustrate voltage and current waveforms between an electrode and a workpiece for comparison between cases where a first embodiment of the present invention applies and does not apply.

FIG. 7 is a machining gap voltage waveform chart in the block diagram shown in FIG. 6.

DESCRIPTION OF THE PREFERRED EMBODIMENTS

Figure 1:
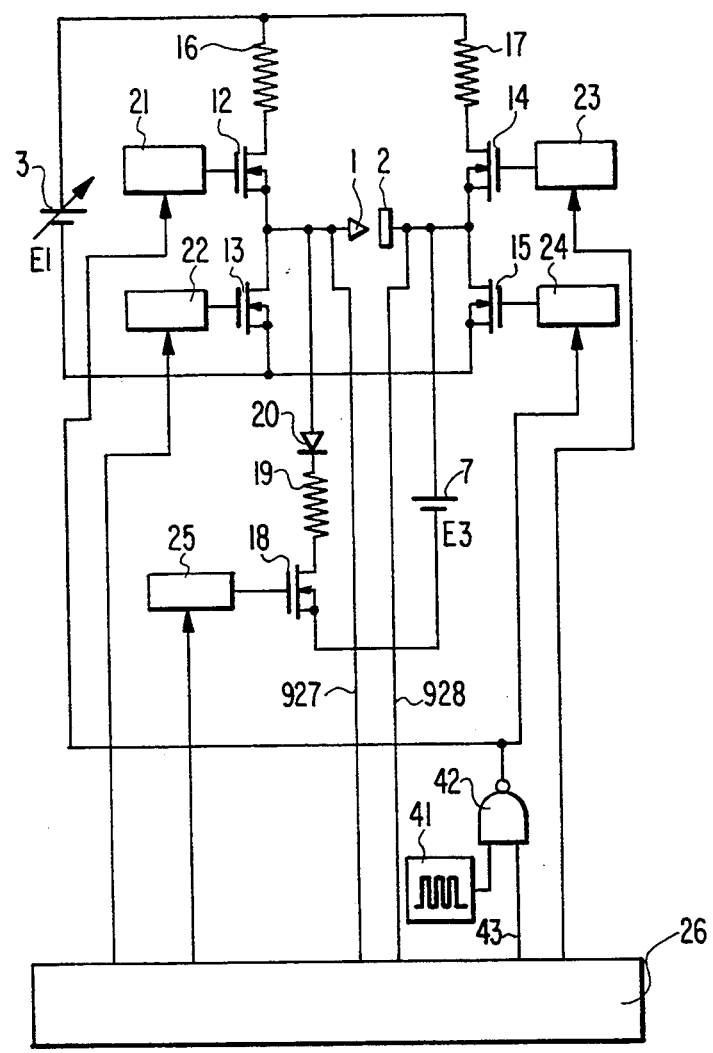
FIG. 1 is an arrangement block diagram of a machining gap voltage application circuit in an electrical discharge machine, illustrating preferred embodiments of the present invention.
Figure 14:
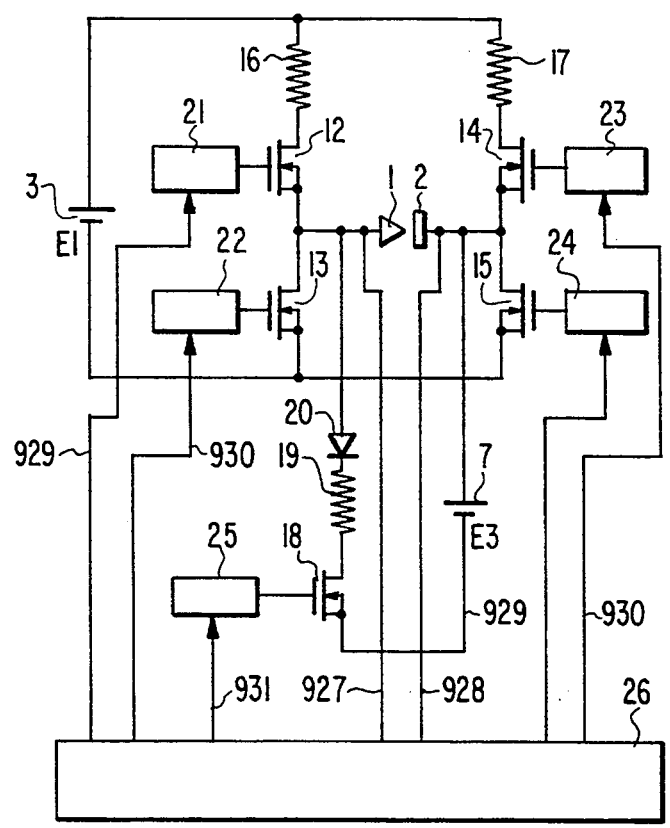
FIG. 14 is an arrangement block diagram of a machining gap voltage application circuit in an electrical discharge machine known in the art.
Figure 15:
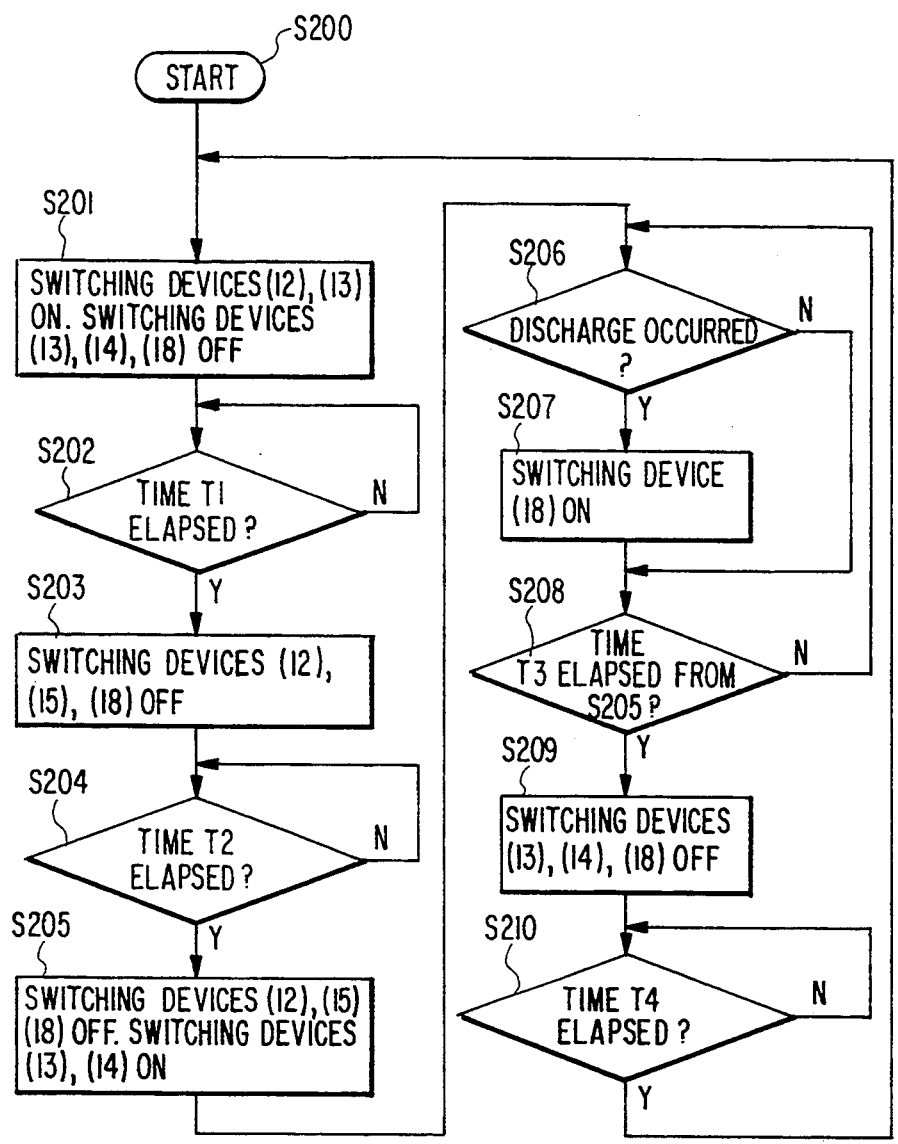
FIG. 15 is an operation flowchart for the block diagram shown in FIG. 14.

FIG. 1 is a block diagram of a machining gap voltage application circuit of an electrical discharge machine, illustrating an embodiment of the present invention, wherein the numerals 1 to 3, 7 and 12 to 26 indicate parts identical to those in FIG. 14 showing the conventional design and, therefore, will not be described here.

In FIG. 1, 41 indicates a high-frequency oscillation circuit, and 42 a two-input NAND circuit. The oscillation output of the high-frequency oscillation circuit 41 is connected to one input terminal of the two-input NAND circuit 42, and a control signal 43 output from a control circuit 26 is connected to the other input terminal thereof.

The control signal 43 is identical to the control signal on line 929 in FIG. 14. The output terminal of the two-input NAND circuit 42 is connected to driving circuits 21 and 24. The control circuit 26, the high-frequency oscillation circuit 41, the two-input NAND circuit 42 and the driving circuits 21 to 24 constitute a switching control circuit.

The operation of the machining gap voltage application circuit shown in FIG. 1 will now be described. In the operation of the machining gap voltage application circuit shown in FIG. 1, the semiconductor switching devices 12 and 15 are intermittently turned ON/OFF at the oscillation frequency (normally 1 to 2 MHz) of the high-frequency oscillation circuit 41 in a period of time when a negative voltage is applied to the machining gap in the operation of the conventional machining gap voltage application circuit shown in FIG. 14, i.e., in a period of time T1.

Figure 2A:
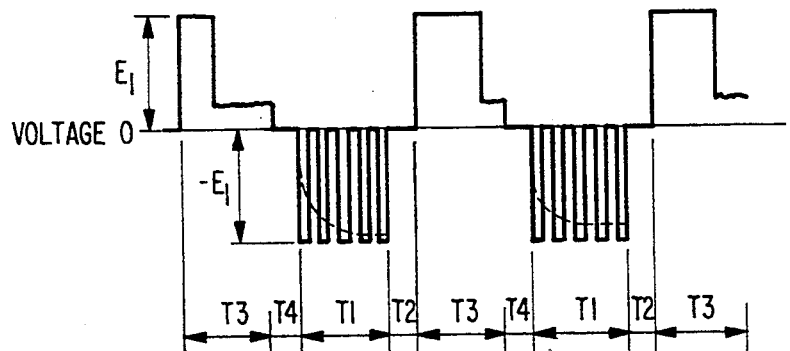
FIGS. 2(a)–2(d) are machining gap voltage and current waveform charts for the arrangement block diagram in FIG. 1.
Figure 2B:
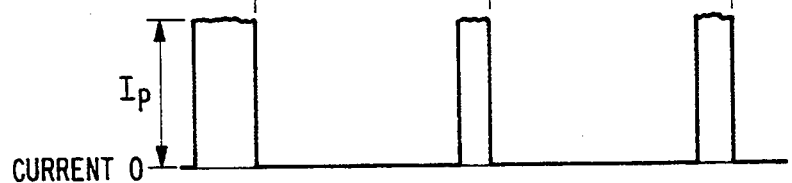
Figure 16A:
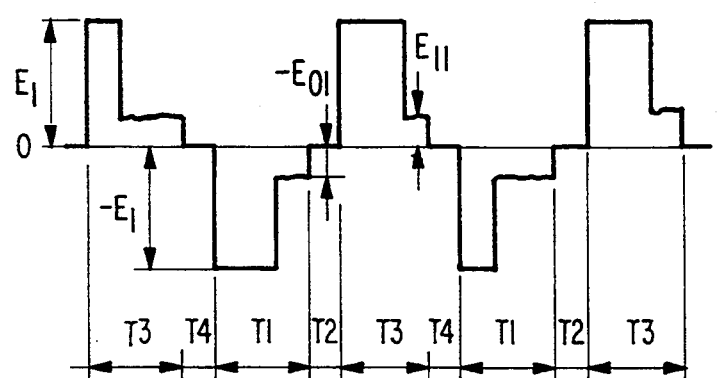
FIGS. 16(a) and 16(b) are machining gap voltage and current waveform charts in the arrangement block diagram shown in FIG. 14.
Figure 16B:
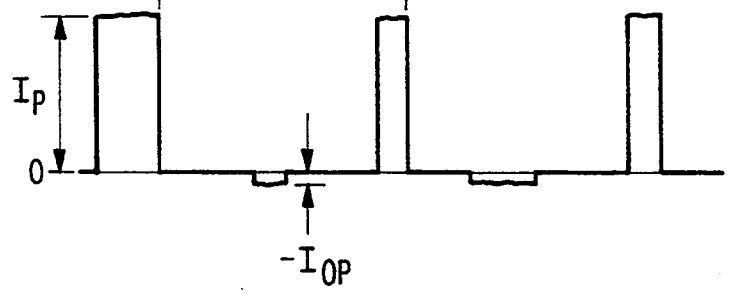

FIGS. 2(a) and 2(b) show machining gap voltage and current waveforms, respectively,, at a time when a discharge does not occur in the time T1. As shown in FIG. 2(b), whereas a current of Ip identical in magnitude to that conventionally seen in FIG. 16(b) flows in time T3, no current flows in the time T1.

In FIG. 2(a), a high-frequency pulse waveform represented by a continuous line in the time T1 indicates a waveform at a time when electrostatic capacity components do not exist in the machining gap, i.e., between the workpiece 2 and the electrode 1. The waveform represented by a dotted line gradually approaching a voltage of −E1 from zero volts in the period of time T1 indicates a waveform occurring when the electrostatic capacity components exist therein.

FIGS. 3(a) and 3(b) show machining gap voltage and current waveforms in the time T1, respectively, at a time when an electrical discharge has taken place in the time T1.

In FIGS. 3(a) and 3(b), a waveform 301 and a waveform 302 represented by continuous lines are a voltage waveform and a current waveform in the machining gap generated by the machining gap voltage application circuit shown in FIG. 1, respectively, at a time when an electrostatic capacity does not exist in the machining gap.

As indicated by the waveform 301, though the voltage rises to −E01 when an electrical discharge occurs at specific time of day TT1 in the time T1, the semiconductor switching devices 12 and 15 are turned OFF in a short time (less than the oscillation period of the high-frequency oscillator 41).

At this time, a current of −Iop flows at the time TT1 as shown in FIG. 3(b) but returns to zero in a short time as described in the aforementioned voltage waveform.

A waveform 303 and a waveform 304 represented by dotted lines in FIGS. 3(a) and 3(b) are a voltage waveform and a current waveform in the machining gap generated by the conventional machining gap voltage application circuit shown in FIG. 14 and are shown for comparison with waveforms 301 and 302, respectively.

As indicated by the waveform 303, in the machining gap voltage application circuit shown in FIG. 14, once an electrical discharge is started at the time TT1, it continues until the time T1 ends, and the machining gap voltage remains high at −E01 while the discharge continues. Regarding the current waveform, as shown in FIG. 3(b), the current −Iop lasts until the time T1 ends.

According to the conventional machining gap voltage application circuit shown in FIG. 14, therefore, once a discharge is started with a negative voltage applied to the machining gap, it continues until the time T1 ends, substantially reducing the quality of the machined surface of the workpiece 2. By comparison, according to the machining gap voltage application circuit of the present invention shown in FIG. 1, if a discharge is started, the discharge current returns to zero in a short time, thereby preventing the quality of the machined surface of the workpiece 2 from being degraded.

Figure 4A:
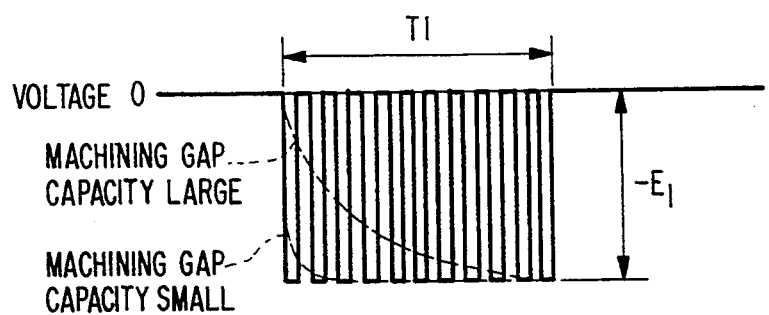
FIGS. 4(a), 4(b) and 4(c) are waveform charts illustrating a relationship between a duty factor and a machining gap voltage in a second embodiment of the present invention.

The first embodiment of the invention also concerns the case when electrostatic capacity components exist in the machining gap, as described previously. In such case, the voltage waveform represented by the dotted line in FIG. 2(a) appears in the time T1. While this voltage waveform slowly approaches −E1 from zero volts in the process of time if the electrostatic capacity in the machining gap is large, it rapidly approaches −E1 from zero volts if the capacity is small, as shown in FIG. 4(a).

Figure 4B:
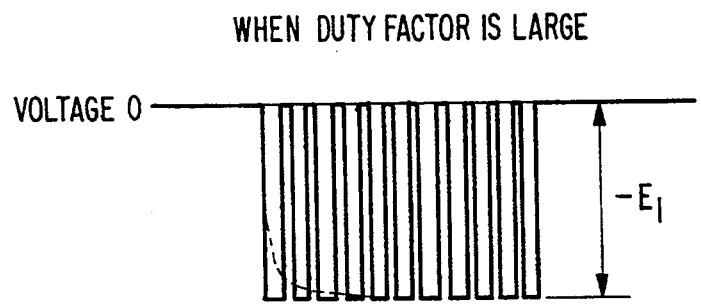
Figure 4C:
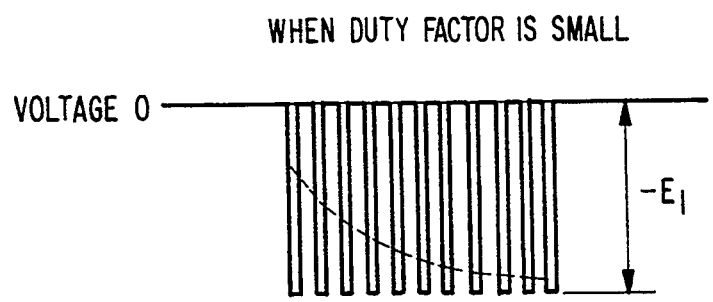

As shown in FIGS. 4(b) and 4(c), even when the electrostatic capacity is identical in the machining gap, the velocity of approaching the voltage of −E1 from the zero volt state varies depending on the magnitude of the duty factor of the oscillation output waveform of the high-frequency oscillator 41.

Namely, when the duty factor is large (the period of time when the semiconductor switching devices 12 and 15 are ON is longer than the period of time when the same are OFF), the voltage of −E1 is reached rapidly. In reverse, when the duty factor is small, the voltage of −E1 is reached slowly.

Accordingly, whether the electrostatic capacity exists or does not exist in the machining gap, changing the duty factor allows the integrated value of the negative voltage imposed to the machining gap in the time T1 to be varied.

Hence, by setting the duty factor to render the integrated values of the positive and negative voltages applied to the machining gap equal on the average, i.e., to zero the average voltage, the deformation and magnetization of the workpiece 2 surface can be more perfectly prevented from occurring due to electrolysis or electrolytic corrosion.

Figure 2C:
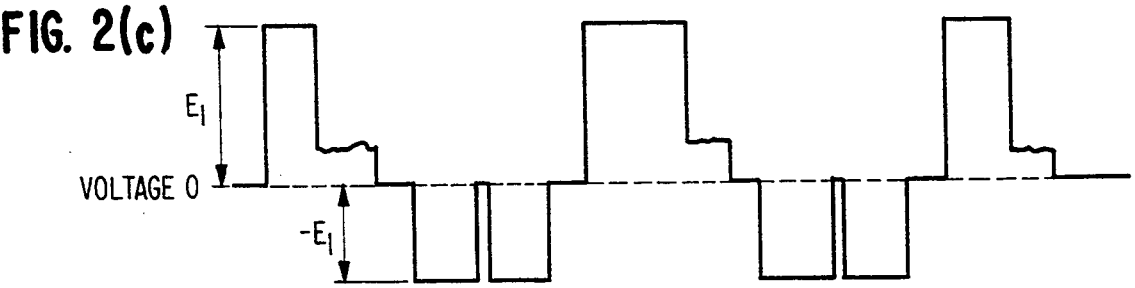
Figure 2D:
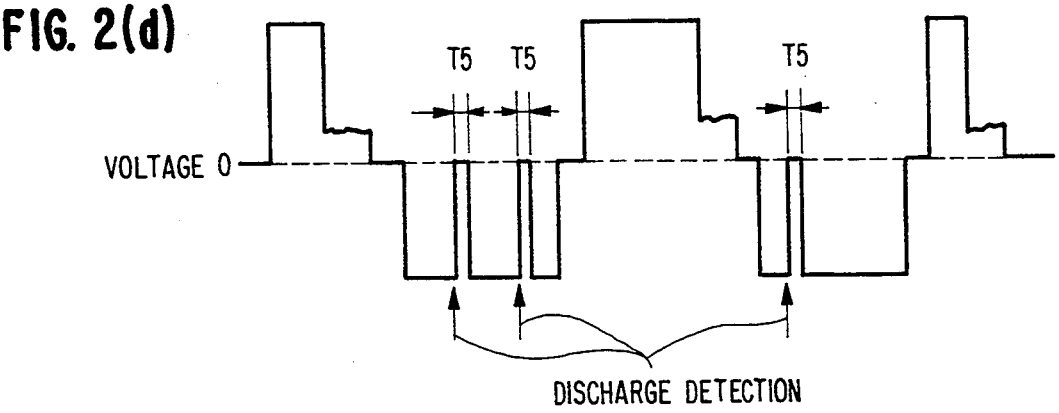

It should be noted that in the first embodiment of FIG. 1, the switching device 12 is turned ON and OFF many times in response to the high frequency output of the oscillation circuit 41. However, as shown in FIG. 2(c), current may be cut off whenever appropriate during the time of negative voltage application. Furthers as shown in FIG. 2(d), after discharge by the negative voltage is detected, the switching device 12 may be turned OFF for the predetermined period of time T5 after discharge and then turned ON again.

Figure 5A:
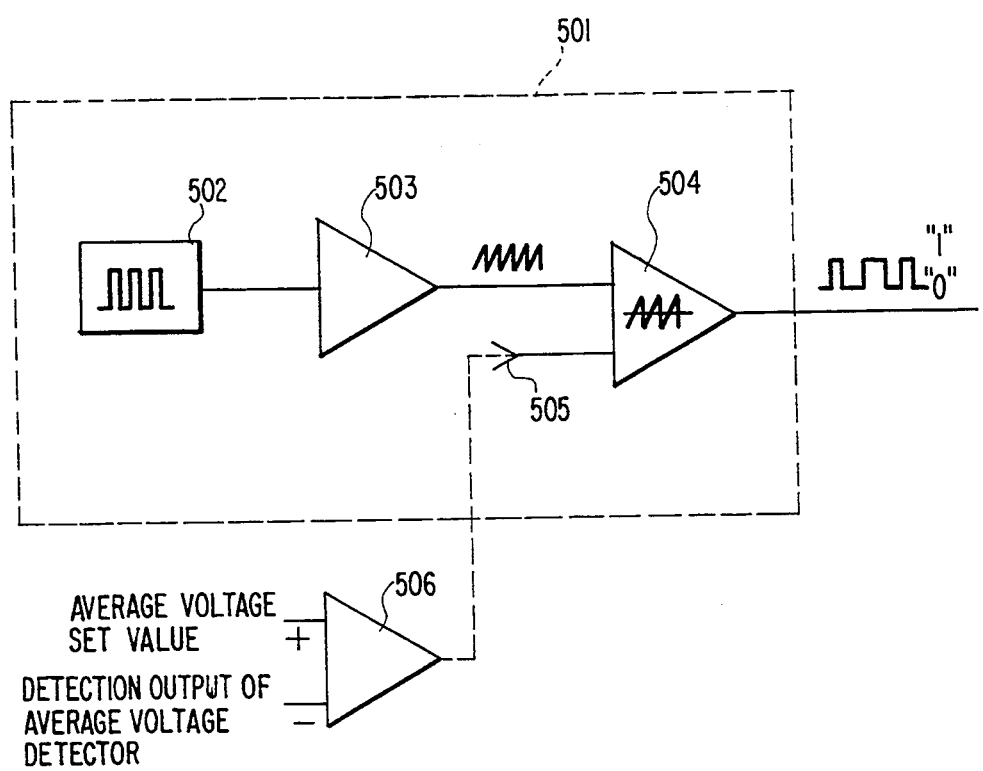
FIG. 5(a) illustrates a circuit for changing the duty factor in a second embodiment of the present invention and FIG. 5(b) illustrates waveforms related thereto.
Figure 5B:
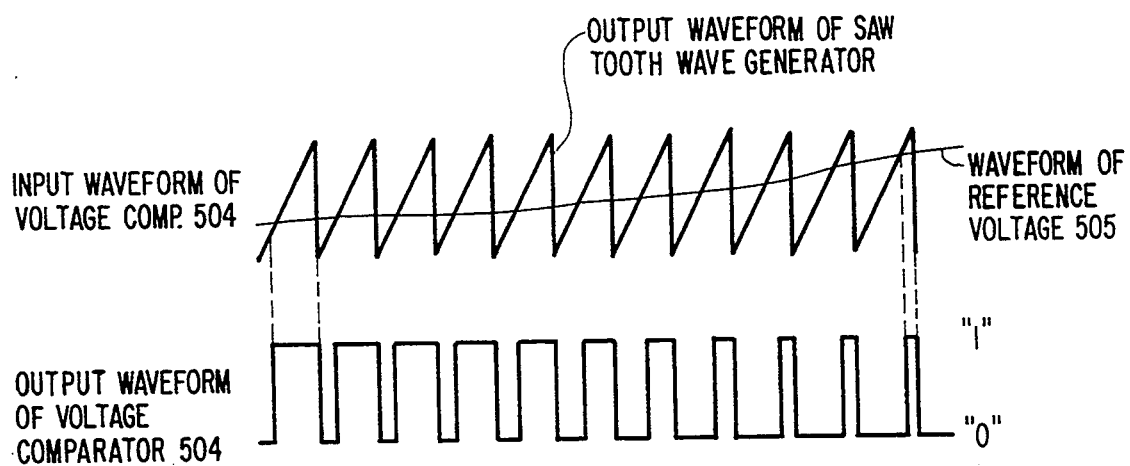

FIGS. 5(a) and 5(b) illustrate an example of a method and apparatus for changing the duty factor.

In FIG. 5(a), 501 indicates a high-frequency oscillation circuit which is designed to change the duty factor. This high-frequency oscillation circuit 501 is used in place of the high-frequency oscillation circuit 41 in the machining gap voltage application circuit illustrated in FIG. 1.

502 indicates a system clock generator for generating a clock pulse of a predetermined frequency having a certain duty factor.

503 indicates a saw tooth pulse generator for receiving the clock pulse as an output signal of the system clock generator 502 and generating a saw tooth pulse of a frequency identical to that of said clock pulse.

504 indicates a voltage comparator for comparing the output signal of the saw tooth pulse generator 503 and the voltage of a reference voltage terminal 505. The voltage comparator 504 outputs a "1" signal if the magnitude of the output signal of the saw tooth pulse generator 503 is greater than the voltage of the reference voltage terminal 505, and outputs a "0" signal if smaller.

The "1" signal is represented by a predetermined positive voltage, and the "0" signal by zero volts or a voltage near zero volts.

The high-frequency oscillation circuit 501 allows the duty factor of the output waveform to be changed by varying the magnitude of the voltage of the reference voltage terminal 505. That is, by setting the voltage of the reference voltage terminal 505 to a higher value, a pulse whose "1" period is shorter than its "0" period is output from the output terminal of the voltage comparator 504, i.e., the output terminal of the high-frequency oscillation circuit 501. In comparison, by setting the voltage of the reference voltage terminal 505 to a lower value, a pulse whose "1" period is longer than its "0" period is output from the output terminal of the voltage comparator 504, i.e., the output terminal of the high-frequency oscillation circuit 501.

FIG. 5(b) shows the input and output waveforms of the voltage comparator 504 for comparison with each other.

By connecting to the reference voltage terminal 505 the amplification output of an amplifier circuit 506 which amplifies a difference between the detection output of a machining gap average voltage detector (not shown) and an average voltage set value, negative feedback is effected to allow the duty factor to be automatically changed so that the average voltage in the machining gap becomes the average voltage set value.

By setting the average voltage set value to zero volts at this time, the duty factor is automatically set so that the average voltage of the machining gap becomes zero volts.

Duty factor controlling means comprises the saw tooth pulse generator 503, the voltage comparator 504 and the amplifier circuit 506. The duty factor controlling means is not confined to analog signal processing but may perform digital processing.

Figure 6:
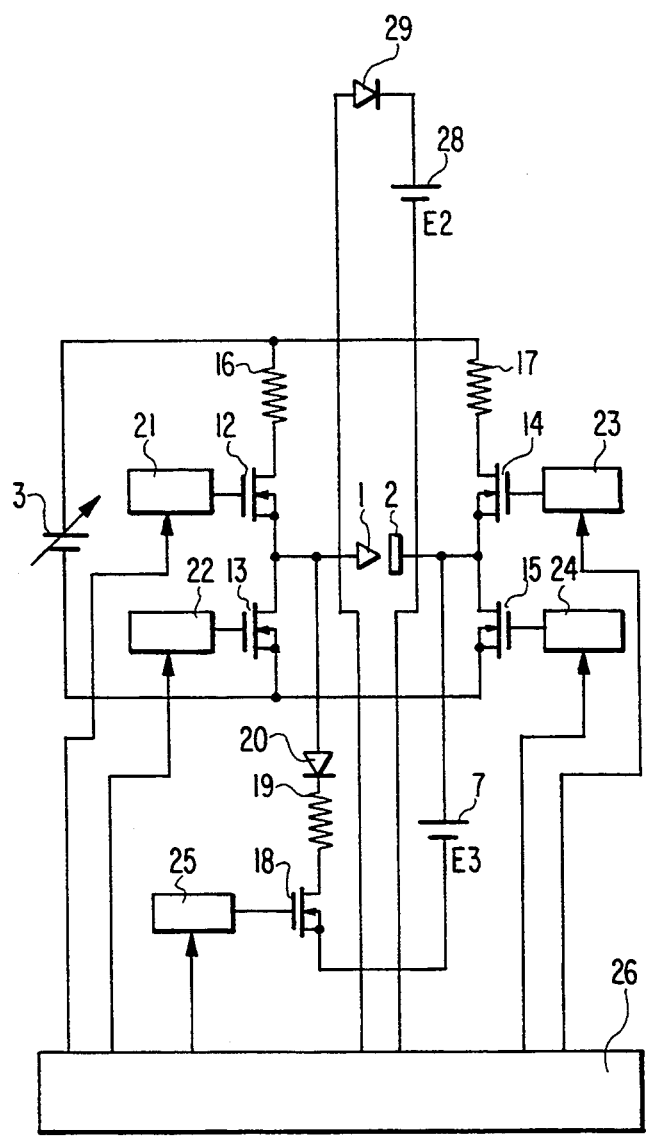
FIG. 6 is an arrangement block diagram of a machining gap voltage application circuit in an electrical discharge machine, illustrating a third embodiment of the present invention.

FIG. 6 is an arrangement block diagram of a machining gap voltage application circuit illustrating another embodiment of the present invention.

Referring to FIG. 6, 28 indicates a second direct-current power supply which outputs a voltage of E2, and 29 a rectifier circuit whose cathode is connected to the anode of the second direct-current power supply 28, for example, a diode. The absolute value of E2 is set to a smaller value than that of E1. The anode of the diode 29 is connected to the electrode 1, and the cathode of the second direct-current power supply 28 connected to the workpiece 2.

FIG. 6 is identical to FIG. 14 showing the conventional design, with the exception that the second direct-current power supply 28 and diode 29 have been added. The parts indicated by the numerals 1 to 3, 7 and 12 to 26 will not be described here because they are identical to those in FIG. 14.

The operation of the machining gap voltage application circuit shown in FIG. 6 will now be described.

In the machining gap voltage application circuit shown in FIG. 6, a series connection of the second direct-current power supply 28 and the diode 29 has a clamping function that keeps the absolute value of the negative voltage applied to the machining gap from becoming larger than the output voltage E2 of the second direct-current power supply 28.

Namely, if the semiconductor switching elements 12 and 15 are turned ON, the negative voltage having an absolute value of E1 is not imposed onto the machining gap. The gap voltage is clamped to the voltage of E3, which is smaller than E1.

The diode 29 functions to inhibit a current flowing from the anode of the second direct-current power supply 28 to the electrode 1.

FIG. 7 illustrates voltage waveforms in the machining gap. One waveform has a crest value in time T1 that is represented by a dotted line and has a magnitude of −E1. This is a waveform representing voltage levels before the start of an electrical discharge in a state wherein the series connection of the second direct-current power supply E2 and the diode 29 is not connected between the electrode 1 and the workpiece 2, i.e., in an unclamped state.

A second waveform has a crest value in the time T1 that is represented by a continuous line and has a magnitude of −E2. This is a waveform representing voltage levels before the start of an electrical discharge in a clamped state.

Since the magnitude of the negative voltage applied to the machining gap is thus clamped to the voltage −E2, the discharge resulting from the negative voltage is reduced or inhibited, thereby preventing the machined surface of the workpiece 2 from being reduced in quality.

It will be recognized that the second direct-current power supply 28 may also be a power supply for incoming current only or a zener constant-voltage circuit, e.g., a zener diode.

Therefore, the second direct-current power supply 28 can be made up at low costs.

In FIG. 7, a positive voltage is imposed onto the machining gap in time T3. In this time T3, before the discharge is started, the voltage at a magnitude of E1 is applied to the machining gap. Whether the positive or negative voltage is applied to the machining gap, its absolute value decreases as soon as the discharge is initiated.

Figure 8:
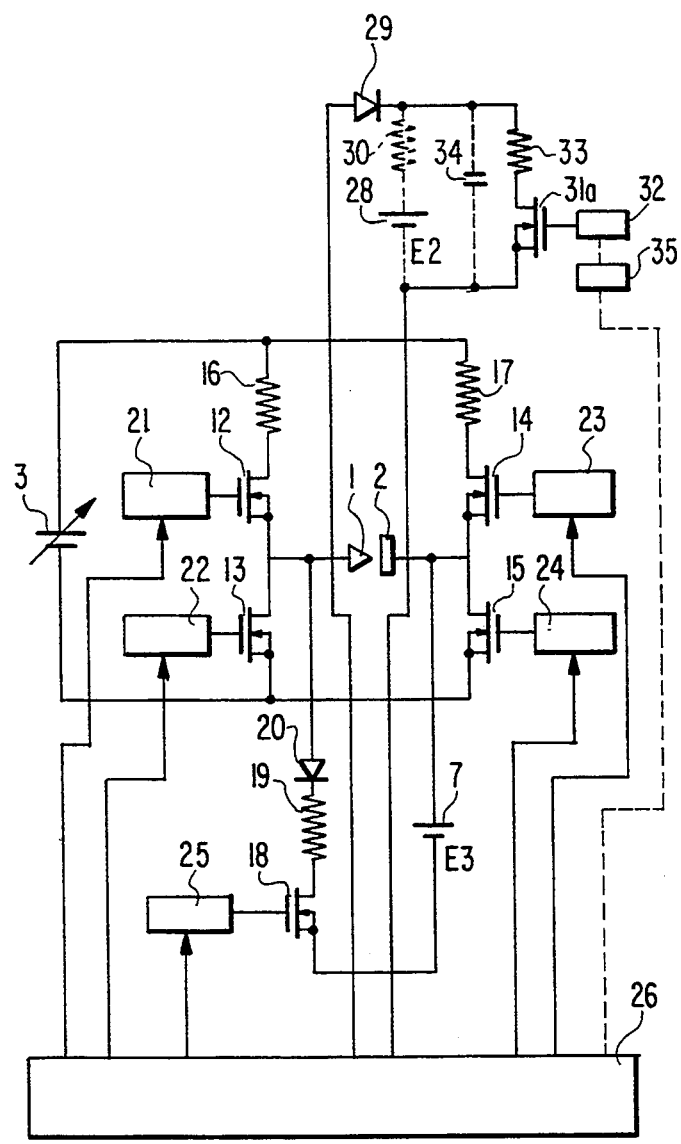
FIG. 8 is an arrangement block diagram of a machining gap voltage application circuit in an electrical discharge machine, illustrating a fourth embodiment of the present invention.

FIG. 8 is a block diagram of a machining gap voltage application circuit illustrating a further embodiment of the present invention.

The machining gap voltage application circuit shown in FIG. 8 is designed to allow the machining gap voltage to be varied in the machining gap voltage application circuit according to the embodiment shown in FIG. 6.

In FIG. 8, 30 indicates a resistor, and the anode of the diode 29 is connected to the electrode 1 and the cathode of the diode 29 connected to one end of the resistor 30. The other end of the resistor 30 is connected to the anode of a second direct-current power supply 28 and the cathode of the second direct-current power supply 28 is connected to a workpiece 2.

31 indicates a switching element, e.g., a semiconductor switching device. 32 indicates switching driving means, e.g., a driving circuit, which outputs a control signal for driving ON/OFF the semiconductor switching device 31 to a control terminal 31a of the semiconductor switching device 31.

33 indicates a resistor and one end thereof is connected to the cathode of the diode 29. The semiconductor 31 is connected between the other end of the resistor 33 and the workpiece 2. 34 indicates a capacitor which is connected between the cathode of the diode 29 and the workpiece 2.

The numerals 1 to 3, 7 and 12 to 29 in FIG. 8 are identical to those shown in FIG. 14 and will therefore not described here.

The resistor 30 may be omitted if the internal resistance of the second direct-current power supply 28 is sufficiently large.

The operation of the machining gap voltage application circuit shown in FIG. 8 will now be described.

The driving circuit 32 is designed to enter into the control terminal 31a of the semiconductor switching device 31 the control signal for turning ON/OFF the semiconductor switching device 31 at a period shorter than the time constant of a CR circuit comprising the stray capacity in the machining gap, the capacitor 34 and the resistor 33.

The machining gap voltage is allowed to be changed by varying the duty factor of the ON/OFF operation of the semiconductor switching device 31.

That is, by causing the average voltage of the machining gap to be zero volts or nearly zero volts by selecting and setting the duty factor, the deformation and magnetization of the workpiece 2 surface can be prevented from occurring due to electrolysis or electrolytic corrosion.

The capacitor 34 employed to prevent the fluctuation of the machining gap voltage may be omitted when the frequency of the ON/OFF operation of the semiconductor switching device 31 is large and the stray capacity of the machining gap is large.

The second direct-current power supply 28 connected in series with the resistor 30 is provided to impose the voltage E2 of the second direct-current power supply 28 onto the capacitor 34 when the semiconductor switching devices 31, 15 and 16 are OFF. This voltage E2 allows the voltage across the capacitor 34 to be prevented from rising due to a surge voltage and allows an inrush current for charging the capacitor 34 to be reduced.

Switching element duty factor controlling means 35 connected by a dotted line in FIG. 8 may be employed to automatically set the duty factor so that negative feedback control is carried out and the average voltage of the machining gap becomes an average voltage set value, as in FIG. 5(a), using the detection output of a machining gap average voltage detector (not shown). In this case, setting the average voltage set value to zero volts causes the machining gap average voltage to be zero volts.

The resistor 33 may be replaced by an inductor, in which case power consumption due to the heat generation of the resistor 33 can be prevented.

Each of the first to fourth embodiments is designed to offset the positive-polarity voltage and the negative-polarity voltage during machining. However, this results in an increase in negative-polarity voltage application time, a reduction in the frequency of the current pulses contributing to machining and a reduction in the pulses generated by the second direct current power supply 7. Consequently, the machining speed is limited.

The fifth embodiment of the present invention is arranged to also solve this disadvantage. The fifth embodiment of the present invention will now be described in accordance with FIGS. 9 and 10.

Figure 9:
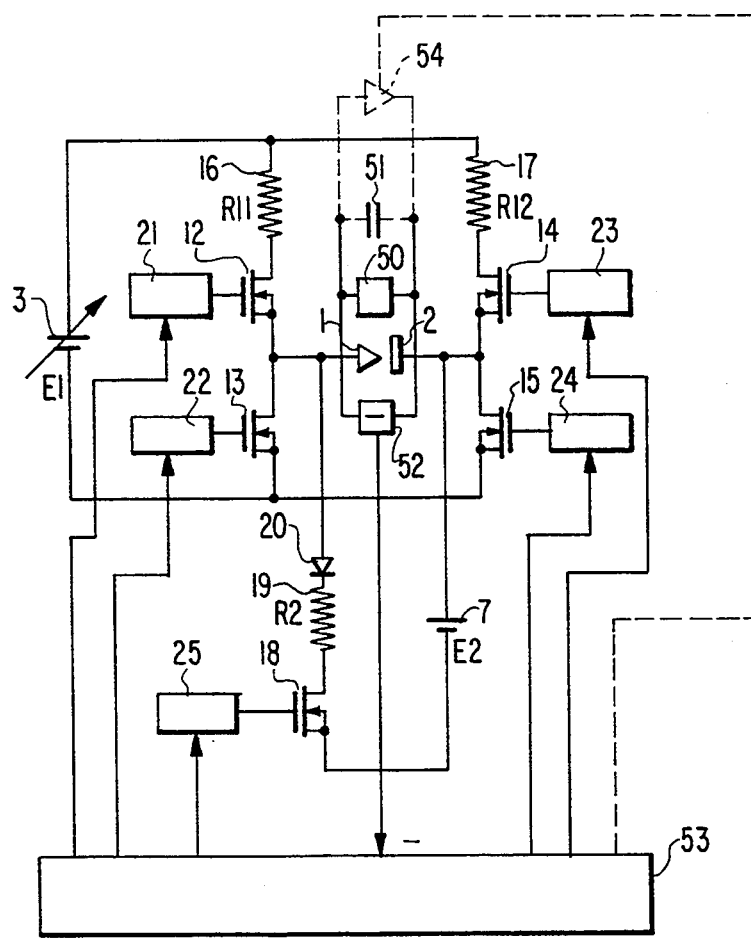
FIG. 9 is a block arrangement diagram of a gap voltage application circuit in an electrical discharge machine, illustrating the fifth embodiment of the present invention.

In FIG. 9, 50 indicates a voltage clamp circuit for clamping the negative-polarity voltage supplied to the machining gap, which is identical to the voltage clamp circuit consisting of the third direct current power supply 28 and the diode 29 in the previously described third embodiment of FIG. 6 and is schematically illustrated. 51 denotes an electrostatic capacitance floating in the machining gap, 52 represents a discharge detection circuit for detecting a negative-polarity discharge generated by the first direct current power supply 3, and 53 designates a control circuit which gives control signals to the drive circuits 21 to 25 to exercise the ON/OFF control of the semiconductor switching devices 12 to 15 and 18 as described later. Other parts are essentially identical to those in the previously described embodiments and therefore will not described here.

Figure 10A:
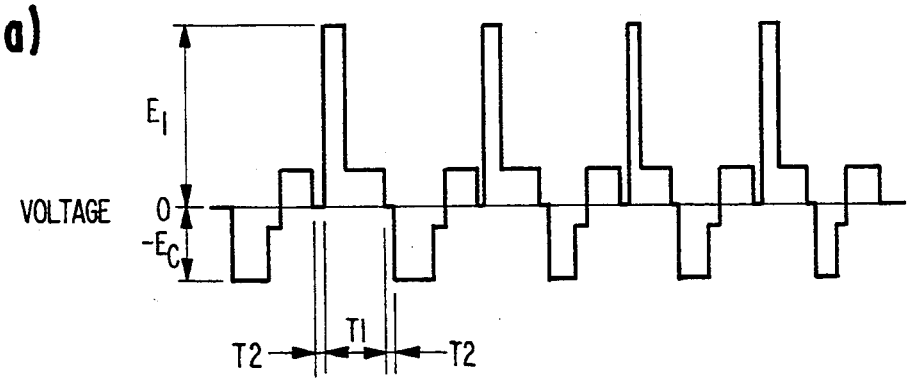
FIGS. 10(a) and 10(b) are voltage/current waveform diagrams concerned with the fifth embodiment of the present invention.

Operation will now be described. At the start of operation, among the semiconductor switching devices 12 to 15 bridge-connected with the electrode 1 and the workpiece 2 in between, the semiconductor switching devices 13, 14 on one of two diagonal lines are both switched ON and the semiconductor switching devices 12, 15 on the other diagonal line and the semiconductor switching device 18 connected to the second direct current power supply 7 are switched OFF. At this time, a +E1 voltage is applied to the machining gap as shown in FIG. 10(a); this voltage may be in the range of 140 V to 160 V in a practical operation. After this state has continued for the length of time T1, all of the semiconductor switching devices 12 to 15, 18 are switched to an OFF condition to bring the operation to a stop.

After this stop state has elapsed for the period of time T2, the semiconductor switching devices 12, 15 are switched ON; however, the semiconductor switching device 18 remains OFF. At this time, a clamp voltage ($-Ec$ volts) as determined by the clamp circuit 50 is applied to the machining gap; this voltage magnitude is in the range of 70 V to 80 V. Since E1 is approximately $2\times$ that of Ec but of shorter duration, the voltages can average 0 but the frequency can be higher. The discharge generated by the negative-polarity voltage is detected by the discharge detection circuit 52, which then transmits a detection signal to switch OFF the switching devices 12, 15. If the switching devices 12, 15 are switched OFF, negative direct current arc current persists for an extremely short period, i.e., approximately several ten to several hundred nanoseconds, until the electrostatic energy accumulated in the electrostatic capacitance 51 of the machining gap is discharged.

By switching ON the switching device 18 before this current is cut off, positive-polarity large current flows in the machining gap, causing progress in machining. If the switching device 18 is switched ON after the negative direct current arc has been cut off, a high positive-polarity voltage is produced in the machining gap, causing an open wire, etc. Clearly, it is important that the negative-polarity current and positive-polarity current should be supplied consecutively, and the length of time from when the switching devices 12, 15 are switched OFF to when the switching device 18 is switched ON must be approximately several ten nanoseconds. A predetermined period of time after the switching device 18 is switched ON, the switching device 18 is switched OFF to bring the operation to a stop. After time T2 has elapsed in this stop state, the above cycle is repeated to carry out machining.

Figure 10B:
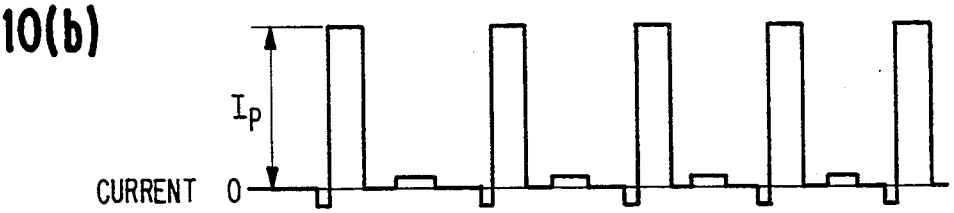

Since resistance values R11, R12 of the current limiting resistors 16, 17 are selected to be sufficiently larger than resistance value R2 of the resistor 19 as in the conventional design, the peak current value supplied from the second direct current power supply 7 when the semiconductor switching device 18 is switched ON is sufficiently higher than the peak current value supplied from the first direct current power supply 3 via the semiconductor switching devices 12 to 15 as shown in a current waveform of FIG. 10(b), and the current contributing to the actual electrical discharge machining is mostly supplied to the machining gap by the semiconductor switching device 18.

Also, positive- and negative-polarity voltage application times are preset so that the positive-polarity voltage and the negative-polarity voltage during machining are offset (the sum is zeroed on the average).

As is seen from the comparison between FIGS. 10(a) and 10(b) and FIGS. 16(a) and 16(b), the present embodiment allows the switching device 18 to be switched ON at higher frequency than in the conventional machining design wherein the zero average voltage is maintained, whereby a high current pulse can be supplied to the machining gap at high frequency and the machining speed can be improved greatly.

While positive-polarity voltage application time T1 was preset to offset the positive-polarity voltage and the negative-polarity voltage during machining in the fifth embodiment, an average voltage detection means (indicated by the numeral 54 in FIG. 9) may be provided to detect the average voltage during machining in order to control positive-polarity voltage application time T1 so that the average voltage may be zeroed, thereby providing a more reliable electrolytic corrosion prevention effect.

Figure 11A:
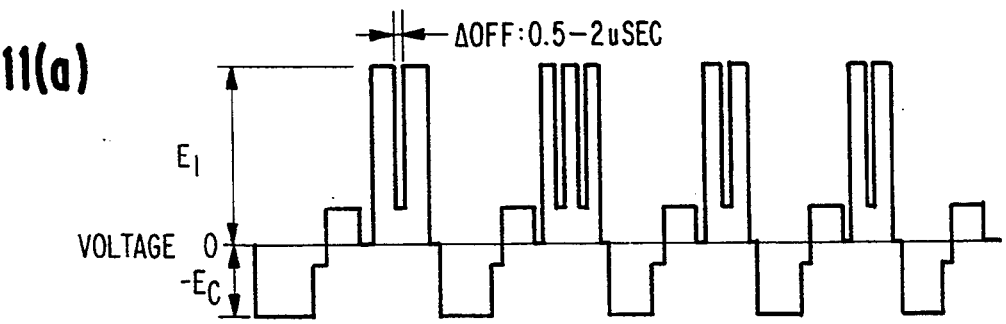
FIGS. 11 (a) and 11 (b) are voltage/current waveform diagrams concerned with the sixth embodiment of the present invention.
Figure 11B:
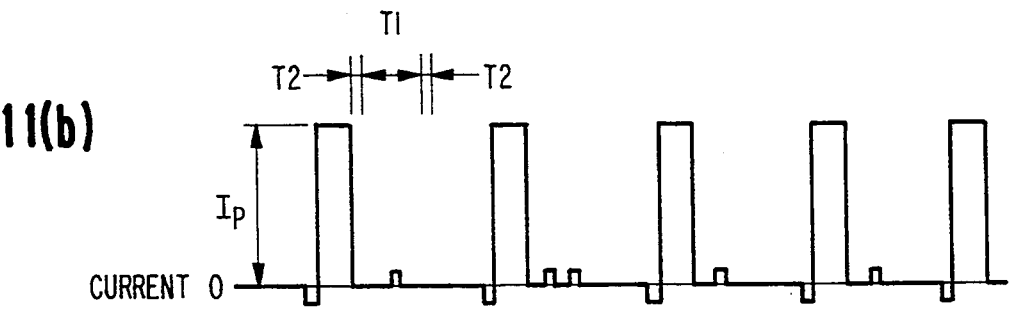
Figure 12:
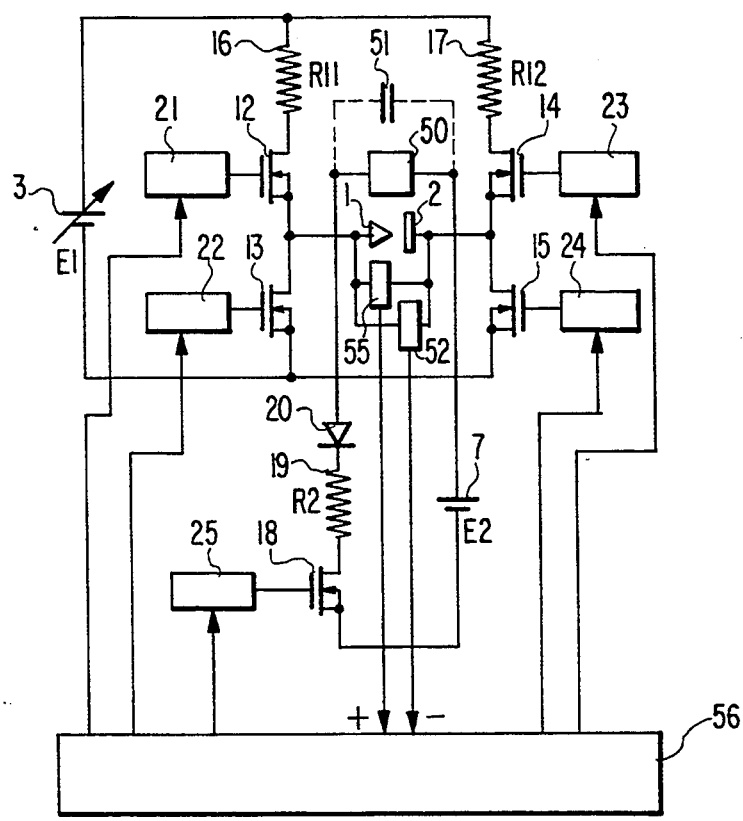
FIG. 12 is a block arrangement diagram of a gap voltage application circuit in an electrical discharge machine, illustrating a seventh embodiment of the present invention.

Also, by providing discharge detection means 55 for detecting a discharge generated by the positive-polarity voltage as shown in FIG. 12, and by providing extremely short, irreducible minimum stop time required to shut off the direct current arc produced by the positive-polarity voltage when the discharge is generated by the positive-polarity voltage as shown in FIGS. 11(a) and 11(b), the persistence of the direct current arc produced by the positive-polarity voltage can be prevented, ensuring more stable machining. The appropriate length of this extremely short stop time is 0.5 to 2 sec according to experiments, though it depends on the status of the machining gap and the type of the workpiece.

Conversely, discharge detection means 52 for detecting the discharge generated by the negative-polarity voltage may be used to shut off the direct current arc produced by the negative-polarity voltage in a similar manner when the discharge is generated by the negative-polarity voltage.

A seventh embodiment of the present invention will now be described in accordance with FIG. 12.

In FIG. 12, 56 indicates a control circuit which provides control signals to the drive circuits 21 to 25 to carry out the ON/OFF control of the semiconductor switching devices 12 to 15, 18 as described later. Other parts are essentially identical to those in previously described embodiments and will therefore not described here.

Operation will now be described. The present embodiment is arranged to be capable of machining in both a drive mode wherein positive-polarity large current is applied when a discharge occurs due to a positive-polarity voltage as in the conventional design (hereinafter referred to as the first mode) and a drive mode wherein positive-polarity large current is applied when a negative-polarity discharge occurs as in the design of the fifth embodiment (hereinafter referred to as the second mode).

Namely, in the first mode, the workpiece is machined in the operation as performed by the conventional design. First, the switching devices 13, 14 are switched ON to apply the positive-polarity voltage to the machining gap. After the discharge generated by the positive-polarity voltage has been detected by the discharge detection means 55, the switching device 18 is switched ON to supply the positive-polarity large current to the machining gap. Subsequently, after a stop for predetermined time T2, the switching devices 12, 15 are switched ON to apply the negative-polarity voltage. This cycle is repeated to advance the machining. Though low in machining speed, this mode gives a machined surface less damage, such as cracks, and is especially suitable for the machining of sintered materials, e.g., carbide alloy and sintered diamond, and conductive ceramics.

In the second mode, the workpiece is machined in the operation as performed by the fifth embodiment. First, the switching devices 12, 15 are switched ON to apply the negative-polarity voltage to the machining gap. After the discharge generated by the negative-polarity voltage has been detected by the discharge detection means 52, the switching devices 12, 15 are switched OFF. If the switching devices 12, 15 are switched OFF, the negative direct current arc current persists for an extremely short period of time until the electrostatic energy accumulated in the electrostatic capacity 51 of the machining gap is discharged. By switching ON the switching device 18 before this current is cut off, the positive-polarity large current flows in the machining gap, whereby the machining progresses.

The negative-polarity current and positive-polarity current are supplied consecutively, and the switching device 18 is switched OFF after a predetermined period of time to bring the operation to a stop. After time T2 has elapsed in the stop state, the cycle is repeated to carry out machining. Providing high machining speed as described above, this mode is especially suitable for the machining of iron-based materials.

It will be apparent that the workpiece being machined can be prevented from being subjected to electrolytic corrosion in either of these two modes because these modes are preset or controlled to offset the positive-polarity voltage and the negative-polarity voltage during machining (zero the sum on the average).

Figure 13A:
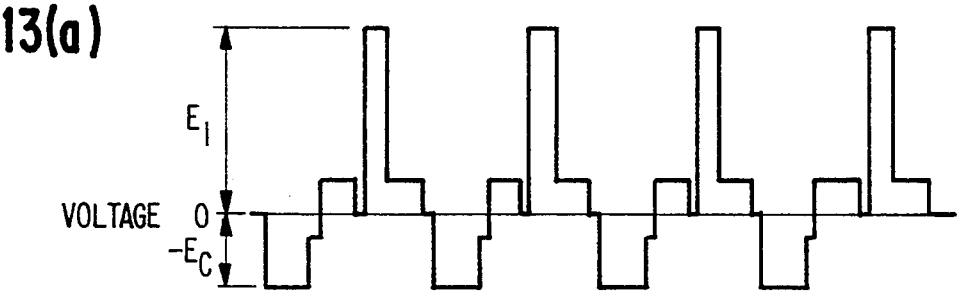
FIGS. 13(a) and 13(b) are voltage/current waveform diagrams illustrating a modification of the seventh embodiment of the present invention.
Figure 13B:
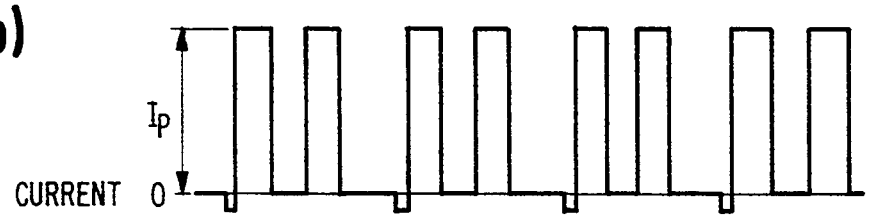

While the seventh embodiment was designed to start the positive-polarity large current when the discharge took place due to either of the positive-polarity voltage and negative-polarity voltage, the large current may be supplied after both discharges due to the positive-polarity voltage and negative-polarity voltage have occurred, as shown in FIGS. 13(a) and 13(b), to improve the machining speed and prevent electrolytic corrosion.

Also, by providing extremely short, irreducible minimum stop time of approximately 0.5 to 2 sec required to shut off the direct current arc due to the positive-polarity voltage or negative-polarity voltage when the discharge is generated by the positive-polarity voltage or negative-polarity voltage as in the sixth embodiment, the persistence of the direct current arc due to the positive-polarity voltage or negative-polarity voltage can be prevented, ensuring more stable machining.

It will be apparent that the first embodiment of the invention achieves an electrical discharge machine which prevents a discharge from occurring at the application of a negative-polarity voltage in machining wherein a zero average voltage is maintained and which allows a discharge, if any has occurred, to be completely eliminated immediately, whereby the machined surfaces of a workpiece can be prevented from being reduced in quality due to the discharge taking place in a negative-polarity voltage application state.

It will also be apparent that the second embodiment of the invention achieves an electrical discharge machine which, in addition to the effects of the first embodiment, allows the average voltage between the electrode and the workpiece to be easily controlled to be a predetermined preset voltage.

It will also be apparent that the third embodiment of the invention achieves an electrical discharge machine which prevents a discharge from occurring at the application of a negative-polarity voltage or prevents the same from taking place where possible, and as a result, the machined surfaces of a workpiece can be prevented from being reduced in quality due to the discharge taking place in the negative-polarity voltage application state.

In addition, the machine clamps the voltage between the electrode and the workpiece at a predetermined voltage in the negative-polarity voltage application state without the transistor performing class A amplification operation, whereby the transistor does not generate heat if the output control of a high-power electrical discharge machining power supply is carried out.

It will also be apparent that the fourth embodiment of the invention achieves an electrical discharge machine which, in addition to the effects of the third invention, allows the voltage between said electrode and workpiece to be the predetermined voltage easily.

It will also be apparent that the fifth embodiment of the invention achieves an electrical discharge machine which, in addition to the effects of the fourth embodiment, allows the average voltage between the electrode and workpiece to be zeroed easily.

It will also be apparent that the sixth embodiment of the invention achieves an electrical discharge machine which improves machining speed in addition to the effect of the third to the fifth embodiments.

It will also be apparent that the seventh embodiment of the invention achieves an electrical discharge machine which, in addition to the effects of the third to the sixth embodiments, prevents the generation of arc which affects machined surfaces at the time of positive-polarity or negative-polarity voltage application.

It will also be apparent that the eighth embodiment of the invention achieves an electrical discharge machine which, in addition to the effects of the third embodiment, allows optimum machining conditions to be selected according to a material to be machined, prevents the generation of microcracks if a material machined is different, and ensures stable, high-level machining with a workpiece protected from electrolytic corrosion.

It will also be apparent that the ninth embodiment of the invention achieves an electrical discharge machine which improves machining speed sharply in addition to the effects of the third embodiment.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. An electrical discharge machine comprising:
   an electrode opposed to a workpiece a predetermined distance away therefrom and defining a gap;
   a first direct-current power supply having first and second terminals;
   a switching circuit for switching between a first voltage application state, wherein said first terminal is connected to said electrode and said second terminal is connected to said workpiece and a first voltage is applied across said gap, a second voltage application state, wherein said first terminal is connected to said workpiece and said second terminal is connected to said electrode and a second maximum voltage is applied across said gap, and a second voltage application reset state wherein substantially zero voltage is applied across said gap; and
   a switching control circuit for controlling said switching circuit to define a first period of time when oscillation occurs between said second voltage application state and said second voltage application reset state such that a voltage being applied across said gap oscillates directly between said second maximum voltage and said substantially zero voltage for a predetermined number of times greater than once, and to define a second period of time when said first voltage application state exists, and to repeat said first and second periods of time in a predetermined sequence.

2. An electrical discharge machine as defined in claim 1 further comprising:
   a limiting circuit connected in series with said switching circuit for limiting the magnitude of a discharge current between said electrode and said workpiece based on said first direct-current power supply; and
   wherein said limiting circuit and said switching circuit are connected so that the magnitude of the current flowing between the electrode and the workpiece is smaller in said second voltage application state than in said first voltage application state.

3. An electrical discharge machine as defined in claim 2, wherein said limiting circuit comprises a resistance.

4. An electrical discharge machine as defined in claim 2, further comprising duty factor controlling means for controlling the ratio of time spent in said second voltage application state to time spent in said second voltage application reset state by means of negative feedback so that an average voltage in said gap between said electrode and said workpiece becomes a preset value.

5. An electrical discharge machine as defined in claim 2, further comprising a series connection of a switching element, and a resistor and switching driving means for turning ON/OFF said switching element, said series connection being connected between said electrode and said workpiece and said switching driving means driving ON/OFF said switching element at a predetermined duty factor for causing the voltage between said electrode and workpiece to be a predetermined value.

6. An electrical discharge machine as defined in claim 2, further comprising a series connection of one of a second direct-current power supply and a rectifier circuit and a series connection of a constant-voltage circuit and a rectifier circuit, said series connection being connected between said electrode and said workpiece so that a voltage between said electrode and said workpiece is clamped to a predetermined value in said second voltage application state.

7. An electrical discharge machine as defined in claim 6, further comprising switching element duty factor controlling means for operating said switching element ON/OFF via said switching driving means and controlling the duty factor of the ON/OFF operation of said switching element so that the average voltage between said electrode and said workpiece becomes a predetermined value.

8. An electrical discharge machine as defined in claim 1, further comprising a series connection of one of a second direct-current power supply and a rectifier circuit and a series connection of a constant-voltage circuit and a rectifier circuit, said series connection being connected between said electrode and said workpiece so that a voltage between said electrode and said workpiece is clamped to a predetermined value in said second voltage application state.

9. An electrical discharge machine as defined in claim 8, further comprising switching element duty factor controlling means for operating said switching element ON/OFF via said switching driving means and controlling the duty factor of the ON/OFF operation of said switching element so that the average voltage between said electrode and said workpiece becomes a predetermined value.

10. An electrical discharge machine as defined in claim 1, further comprising duty factor controlling means for controlling the ratio of time spent in said second voltage application state to time spent in said second voltage application reset state by means of negative feedback so that an average voltage in said gap between said electrode and said workpiece becomes a preset value.

11. An electrical discharge machine as defined in claim 1, further comprising a series connection of a switching element, and a resistor and switching driving means for turning ON/OFF said switching element, said series connection being connected between said electrode and said workpiece and said switching driving means driving ON/OFF said switching element at a predetermined duty factor for causing the voltage between said electrode and workpiece to be a predetermined value.

12. An electrical discharge machine as defined in claim 1, wherein said second voltage application state is one where a negative voltage is applied to the gap.

13. An electrical discharge machine for machining a workpiece, comprising:
an electrode opposed to said workpiece a predetermined distance away therefrom and defining a gap;
a first direct-current power supply having a positive pole terminal and a negative pole terminal;
a switching circuit for switching between a positive-polarity voltage application state, wherein said negative terminal is connected to said electrode and said positive terminal is connected to said workpiece, and a negative-polarity voltage application state, wherein said negative terminal is connected to said workpiece and said positive terminal is connected to said electrode;
a switching control circuit for controlling said switching circuit to define a first period of time when said negative voltage application state exists and a second period of time when said positive voltage application state exists, and to repeat said first and second periods of time in a predetermined cycle;
a voltage clamp circuit for clamping a voltage between the electrode and the workpiece at a predetermined voltage in the negative voltage application state;
first and second discharge detection means for detecting discharges caused by a positive-polarity voltage and a negative-polarity voltage, respectively; and
a second direct current power supply for supplying positive-polarity large current between the workpiece and the electrode;
said second direct current power supply supplying said positive-polarity large current between said workpiece and said electrode if the voltage application state is either of the positive-polarity and negative-polarity states when either of said first and second discharge detection means has detected the discharge.

14. An electrical discharge machine for machining a workpiece, comprising;
an electrode opposed to said workpiece a predetermined distance away therefrom and defining a gap;
a first direct-current power supply having a positive pole terminal and a negative pole terminal;
a switching circuit for switching between a positive-polarity voltage application state, wherein said negative terminal is connected to said electrode and said positive terminal is connected to said workpiece, and a negative-polarity voltage application state, wherein said negative terminal is connected to said workpiece and said positive terminal is connected to said electrode;
a switching control circuit for controlling said switching circuit to define a first period of time when said negative voltage application state exists and a second period of time when said positive voltage application state exists, and to repeat said first and second periods of time in a predetermined cycle;
a voltage clamp circuit for clamping a voltage between the electrode and the workpiece at a predetermined voltage in the negative voltage application state; and
a series connection of a switching element, and a resistor and switching driving means for turning ON/OFF said switching element, said series connection being between said electrode and said workpiece and said switching driving means being operative for driving ON/OFF said switching element at a predetermined duty factor for causing the voltage between said electrode and workpiece to be a predetermined value.

15. An electrical discharge machine as defined in claim 14, further comprising switching element duty factor controlling means for operating said switching element ON/OFF via said switching driving means and controlling the duty factor of the ON/OFF operation of said switching element so that the average voltage between said electrode and said workpiece becomes the predetermined value.

16. An electrical discharge machine for machining a workpiece, wherein an electrostatic capacitance exists between the workpiece and the electrode, comprising:
- an electrode opposed to said workpiece a predetermined distance away therefrom and defining a gap;
- a first direct-current power supply having a positive pole terminal and a negative pole terminal;
- a switching circuit for switching between a positive-polarity voltage application state, wherein said negative terminal is connected to said electrode and said positive terminal is connected to said workpiece, and a negative-polarity voltage application state, wherein said negative terminal is connected to said workpiece and said positive terminal is connected to said electrode;
- a switching control circuit for controlling said switching circuit to define a first period of time when said negative voltage application state exists and a second period of time when said positive voltage application state exists, and to repeat said first and second periods of time in a predetermined cycle;
- a voltage clamp circuit for clamping a voltage between the electrode and the workpiece at a predetermined voltage in the negative voltage application state;
- discharge detection means for detecting a discharge generated by a negative-polarity voltage; and
- a second direct current power supply for supplying positive-polarity large current between the workpiece and the electrode and
- prior to the cutoff of current arc generated by electrostatic energy accumulated in said electrostatic capacitance between the workpiece and the electrode when said discharge detection means detects the discharge caused by the application of the negative-polarity voltage.

17. An electrical discharge machine for machining a workpiece, comprising:
- an electrode opposed to said workpiece a predetermined distance away therefrom and defining a gap;
- a first direct-current power supply having a positive pole terminal and a negative pole terminal;
- a switching circuit for switching between a positive-polarity voltage application state, wherein said negative terminal is connected to said electrode and said positive terminal is connected to said workpiece, and a negative-polarity voltage application state, wherein said negative terminal is connected to said workpiece and said positive terminal is connected to said electrode;
- a switching control circuit for controlling said switching circuit to define a first period of time when said negative voltage application state exists and a second period of time when said positive voltage application state exists, and to repeat said first and second periods of time in a predetermined cycle;
- a voltage clamp circuit for clamping a voltage between the electrode and the workpiece at a predetermined voltage in the negative voltage application state; and
- discharge detection means for detecting a discharge caused by one of a positive-polarity of a negative-polarity voltage;
- said switching control circuit being controlled to shut off direct current arc generated by said one of a positive-polarity voltage and negative-polarity voltage when said discharge detection means has detected the discharge at the application of said one of a positive-polarity or negative-polarity voltage.

18. An electrical discharge machine for machining a workpiece, comprising:
- an electrode opposed to said workpiece a predetermined distance away therefrom and defining a gap;
- a first direct-current power supply having a positive pole terminal and a negative pole terminal;
- a switching circuit for switching between a positive-polarity voltage application state, wherein said negative terminal is connected to said electrode and said positive terminal is connected to said workpiece, and a negative-polarity voltage application state, wherein said negative terminal is connected to said workpiece and said positive terminal is connected to said electrode;
- a switching control circuit for controlling said switching circuit to define a first period of time when said negative voltage application state exists and a second period of time when said positive voltage application state exists, and to repeat said first and second periods of time in a predetermined cycle;
- a voltage clamp circuit for clamping a voltage between the electrode and the workpiece at a predetermined voltage in the negative voltage application state;
- discharge detection means for detecting discharges generated by a positive-polarity voltage and a negative-polarity voltage, respectively;
- a second direct current power supply for supplying positive-polarity large current between said workpiece and said electrode; and
- means for switching between a first mode in which said positive-polarity large current is supplied between said workpiece and said electrode by said second direct current power supply when the discharge generated at the application of said positive-polarity voltage is detected and a second mode in which the positive-polarity large current is supplied between said workpiece and said electrode by said second direct current power supply when the discharge generated at the application of said negative-polarity voltage is detected.

19. A method of controlling the operation of an electrical discharge machine having an electrode opposed to a workpiece a predetermined distance away therefrom and defining a gap, comprising the steps of:
- applying a first direct-current voltage across said gap during a first period of time;
- applying a second maximum direct-current voltage, which is opposite in sign to said first voltage, across said gap during a second period of time; and
- oscillating directly between said second maximum direct-current voltage and zero during said second period of time for a predetermined number of times greater than once to eliminate the current flowing between the electrode and the workpiece during said second period of time.

20. The method of controlling the operation of an electrical discharge machine as set forth in claim 19, wherein said first voltage is a positive voltage and said second voltage is a negative voltage.

21. The method of controlling the operation of an electrical discharge machine as set forth in claim 19, further comprising the step of:

repeating said first and second periods of time in a predetermined cycle.

22. The method of controlling the operation of an electrical discharge machine as set forth in claim 19, wherein said first voltage is a negative voltage and said second voltage is a positive voltage.

23. The method of controlling the operation of an electrical discharge machine as set forth in claim 22, further comprising:
repeating said first and second periods of time in a predetermined cycle.

24. A method of controlling the operation of an electrical discharge machine having an electrode opposed to a workpiece a predetermined distance away therefrom and defining a gap, an electrostatic capacitance existing in said gap, comprising:
applying a first direct-current voltage having a first polarity across said gap during a first period of time;
applying a second direct-current voltage, which has a second polarity, opposite to the polarity of said first voltage, across said gap during a second period of time;
detecting the discharge of second polarity current from said electrostatic capacitance in said gap; and
applying a first polarity current in the machining gap before said second polarity current is cut off to cause
the current flowing between the electrode and the workpiece during said second period of time to be a predetermined value.

25. The method of controlling the operation of an electrical discharge machine as set forth in claim 24, further comprising the step of:
repeating said first and second periods of time in a predetermined cycle, and wherein said predetermined value is approximately zero.

26. The method of controlling the operation of an electrical discharge machine as set forth in claim 24, further comprising the step of:
periodically returning said first voltage to a third voltage, which is smaller in magnitude than said first voltage, during said first period of time.

27. The method of controlling the operation of an electrical discharge machine as set forth in claim 24, further comprising the steps of:
detecting the average voltage during machining; and
controlling at least said first period of time so that the average voltage is a predetermined value.

28. The method of controlling the operation of an electrical discharge machine as set forth in claim 24, wherein said first voltage is a positive voltage and said second voltage is a negative voltage.

29. The method of controlling the operation of an electrical discharge machine as set forth in claim 28, further comprising the step of:
presetting said first and second periods of time and repeating said periods within a cycle having a predetermined sequence so that the positive and negative polarity voltages during machining average approximately zero.

30. The method of controlling the operation of an electrical discharge machine as set forth in claim 28, further comprising the step of:
providing said positive-polarity current while a discharge takes place due to one of a positive-polarity voltage and a negative polarity voltage.

31. The method of controlling the operation of an electrical discharge machine as set forth in claim 28, wherein the magnitude of said positive voltage is approximately twice that of said negative voltage.

32. The method of controlling the operation of an electrical discharge machine as set forth in claim 28, further comprising the step of:
providing said offset current after a discharge takes place due to each of a positive-polarity voltage and a negative polarity voltage.

* * * * *